US010002373B1

(12) United States Patent
Voskamp

(10) Patent No.: US 10,002,373 B1
(45) Date of Patent: Jun. 19, 2018

(54) SYSTEMS AND METHODS FOR PROACTIVELY LOADING CONTENT TO A DEVICE

(71) Applicant: Amazon Technologies, Inc., Reno, NV (US)

(72) Inventor: Edwin Voskamp, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 839 days.

(21) Appl. No.: 13/676,786

(22) Filed: Nov. 14, 2012

(51) Int. Cl.
*G06Q 30/00* (2012.01)
*G06Q 30/06* (2012.01)

(52) U.S. Cl.
CPC ..... *G06Q 30/0601* (2013.01); *G06Q 30/0613* (2013.01); *G06Q 30/0623* (2013.01); *G06Q 30/0641* (2013.01)

(58) Field of Classification Search
CPC ............... G06Q 30/00; G06Q 30/0601; G06Q 30/0613; G06Q 30/0623; G06Q 30/0641
See application file for complete search history.

(56) References Cited

U.S. PATENT DOCUMENTS

| 6,243,761 B1 * | 6/2001 | Mogul | H04L 29/06 709/217 |
| 8,744,988 B1 * | 6/2014 | Hamon | G06N 99/005 706/45 |
| 9,154,826 B2 * | 10/2015 | Raleigh | H04L 67/2847 |
| 2008/0268816 A1 * | 10/2008 | Wormald | H04L 67/24 455/412.2 |
| 2012/0289147 A1 * | 11/2012 | Raleigh | H04L 67/2847 455/3.06 |
| 2013/0051253 A1 * | 2/2013 | Lin | H04L 67/2804 370/252 |

OTHER PUBLICATIONS

Xu, Jianliang, et al. "Caching and prefetching for web content distribution." Computing in science & engineering 6.4 (2004): 54-59. ( Year: 2004).*

* cited by examiner

*Primary Examiner* — Michael Misiaszek
*Assistant Examiner* — Christopher B Seibert
(74) *Attorney, Agent, or Firm* — Eversheds Sutherland (US) LLP

(57) ABSTRACT

This disclosure relates to systems and methods for preloading content on a user device before a user requests the content from a web service provider. The preloaded content may be selected based, at least in part, upon the user's browsing and purchasing history. The web service provider may preload the content to minimize user idle time when interfacing with a web site. The web service provider may determine when to send the preloaded content based, at least in part, on when the user device is likely to connect to the network and/or when the user is likely to use the device to interface with the web service provider.

18 Claims, 8 Drawing Sheets

SYSTEMS AND METHODS FOR PROACTIVELY LOADING CONTENT TO A DEVICE

BACKGROUND

Online content providers attempt to provide a store experience that will encourage users to purchase their products. The store experience may incorporate a variety of aesthetic elements or arrangements that may persuade a user to make a purchase. However, the store experience is also based on other non-aesthetic elements that may be outside the control of the online content provider. The capability of the network that transfers the content from the online content provider to the user device can also impact the store experience. Typically, the online content provider may not control the entire network to the user device. The store experience may be impacted by how long the network takes to transfer the content.

Figure 1:
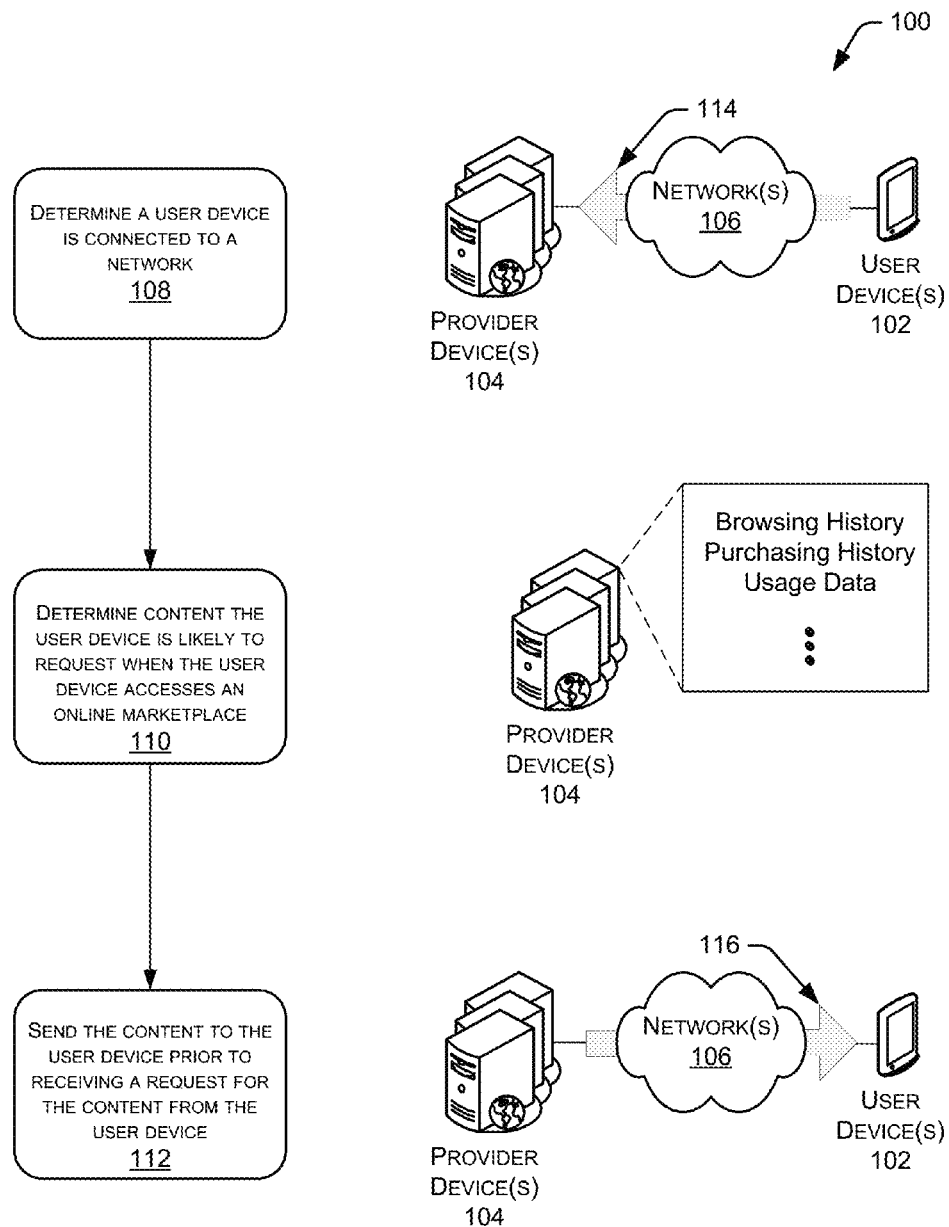
FIG. 1 illustrates a flow diagram for a method for preloading content on a user device before the content is requested in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for determining when to preload content onto a user device and what type of content may be preloaded onto the user device. In one instance, preloading may include loading content onto a user device before receiving a request for the content from the user device. The preloading concept may improve the user store experience by anticipating which content the user wants to view and loading the content before the user requests the content. Accordingly, the preloaded content is displayed faster than waiting for the user to receive a response to a content request from the web services provider.

The amount of time a user waits for content to be displayed is one factor in assessing the user store experience for a web services provider. Longer wait times for content degrade the store experience, while shorter wait times for content improve the store experience by keeping the user engaged on a particular web site. For example, longer wait times may cause the user to find another web site that offers similar products or to find another web site that is more responsive to their requests. Shorter wait times may keep the user engaged by instantaneously presenting content as the content is requested. Keeping the user engaged is more likely to convert the user's clicks into a sale for the web service provider. Generally, more clicks or interactions with the web site are more likely to lead to a sale. In contrast, fewer clicks or interactions with the web site are less likely to lead to sale. Therefore, predicting when a user may visit a website and what content they will request may enable the web service provider to improve the user store experience and increase sales.

In one instance, the web service provider may predict when the user will visit the website and aggregate content that the user will likely request. The web service provider may send that content to the user device before the user accesses the web site. In another embodiment, the web service provider may send the content after the user accesses the web site, but before the user requests (e.g., selects a link on the home page) additional content that is not displayed when the user accesses the web site. Accordingly, the web service provider may preload content when the user is not directly interacting with the web site. Additionally, the web service provider may also preload content when the user is interacting with the web site, but before the user requests to view the preloaded content.

A web service provider may predict when a user is likely to visit a web site based, at least in part, on the frequency and/or distribution of visits by the user. The visit frequency may be based on a single device or two or more user devices that are operated by the user. Over a period of time, the web service provider may be able to predict the time of day, week, month, or year that the user is likely to access the website. The web service provider may also predict which user visits are more likely to result in a sale based, at least in part, on the time of day, week, month, or year. For example, the user may browse for purchases in the morning and then make a purchase in the evening.

A web service provider may also predict what type of content the user is likely to request before the user accesses the web site. The content may be determined based on the user's browsing history, preferences, purchasing history, web site search results, special offers from the web service provider, advertising campaigns, and/or the type of network connection between the web site and the user's device. The aforementioned factors may be used to select preload content before or after the user device interacts with the web site. In another instance, the user device may enter or initially interact with the web site from a particular web page. The initial web page may be considered the entry point to the web site. Once the entry point has been determined, the web service provider may predict which content the user may request. For example, the predication may include content associated with the links embedded in the entry point web page.

In another embodiment, the web service provider may predict what content to preload based on other user's browsing history. The web service provider may select preload content based on the browsing histories of other users. Accordingly, when a new user interacts with the web site, the preload content may include content based on other users that have used the same entry point. The preload content may also include advertising campaign content or special offer content from the web service provider.

Illustrative Methods

FIG. 1 illustrates a flow diagram for a method 100 for preloading content on a user device 102 before the content is requested from a provider device 104 of a web service provider. The preloaded content may be selected based, at least in part, on what the user will want to view on the user device 102. The web service provider may make the content predictions using several factors and then send the preloaded content to the user device 102 over a network 106. The preloaded content may include one or more web pages from the web service provider's web site. The user device 102 may receive several preloaded web pages to provide a near instantaneous browsing experience. For example, the user may move between several web pages without waiting for the web page to download from the provider device 104.

At block 108, the provider device 104 may determine that a user device has connected to the network 106. The provider device 104 may receive a communications signal 114 from the user device 102 (or the network provider) that indicates the user device 102 is available to send or receive content over the network 106.

Broadly, the network 106 may include hardware and/or software elements that enable electrical communication between the user device 102 and the provider device 104. The network 106 may include a combination of wireless and wired elements for transferring content. In one embodiment, the user device 102 may interface with the network using a wired connection that physically couples to the user device 102 and transfers information over a wire.

In another embodiment, the user device 102 may be coupled to the network using a wireless connection (not shown). The wireless connection enables the transfer of content without a physical or tangible contact between the user device 102 and the network 106. The network 106 may include personal area networks ("PANs"), wireless local area networks ("WLANs"), cellular networks, wireless wide area networks ("WWANs"), and so forth. In one instance, the wireless connection may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. In one specific embodiment, the wireless network connection may be enabled by wireless routers (e.g., access points) that receive the wireless signal from the user device and send the content of that signal over the remaining portion of the network 106 to the provider device 104. Likewise, the wireless router may receive content from the provider device 104 and then send the content, wirelessly, to the user device 102.

The wireless connection may also include a wireless phone network provided by a cell phone service provider. The wireless phone network may comply with International Mobile Telecommunications-2000 standard (e.g., 3G telecommunications technology) (See; ITU-R M.687 published in February 1997) or International Mobile Telecommunications-Advanced (e.g., Long Term Evolution standard (LTE) or 4G telecommunications technology) (See; ITU-R IMT-ADV published in March 2008). The wireless phone network may include base stations that send and receive wireless signals to cell phones or other cellular network capable devices (e.g., laptops, tablets . . . etc.).

At block 110, the provider device 104 may determine the content the user of the user device 102 will likely request when the user device 102 interfaces with the web service provider's web site. The content may be selected based, at least in part, on the user's browsing history, purchasing history, and/or usage data.

The browsing history may include a history of the web sites or web pages that the user has visited using the user device 102. The web sites or pages may include those associated with the web service provider and/or other web sites/pages that are administered by other businesses or providers. The browsing history may also include search queries and/or results submitted by the user. The queries/results may provide an indication of the current interest of the user and help determine which type of content to preload. For example, when the user enters a search query on a search engine for printers or a specific brand of printers, the web service provider may select content related to printers to be preloaded onto the user device 102. The preload content may include web pages pertaining to printers and their peripheral's (e.g., ink cartridges, paper).

The browsing history may also include web sites/pages from other devices, in addition to the user device 102, that the user may have used to browse the internet. For example, the user may have more than one user device and may interact with the web service providers using multiple devices. The user may have a mobile phone, a tablet computer, a laptop computer, and/or a desktop computer that may access the network 106 and interface with the provider device 104. The web service provider may use the browsing history from several devices used by the user to determine which content may be most likely to be requested.

The purchasing history may include items that the user has purchased from the web service provider using the user device 102 or any other device. In one specific embodiment, the purchasing history may include the titles and genres for books, music, movies, and/or television shows. The provider device 104 may determine which content may be related to the type of items (e.g., books) that have been purchased or to the concept or topics of the purchased items (e.g., book genre). Additional content may be preloaded based on other books that are related to the purchased book. For example, content for additional books that are written by the same author (or published by the same publisher) may be preloaded onto the user device 102. In another instance, content for books that are in the same genre (e.g. science fiction) may also be selected for preloading. For example, content related to the bestselling books within a particular genre may be preloaded.

The usage data may be an indication of how much the user has consumed or used the purchased items from the web service provider. Broadly, the usage data may provide information on how the user has interfaced with the purchased items. Measuring the amount of interfacing or consumption may vary depending on the type of product that was purchased. In one specific embodiment, the user may have purchased a book and may have read a portion of the book. The user device 102 may provide usage data indicating how much of the book the user has read. This may include a read percentage, the number of pages read, and/or the last page read in the book. The provider device may use the usage data to determine that the user may be in the market for another book. In conjunction with the user's purchasing frequency, the provider device 104 may determine that when the user has read above a threshold amount, the user has shown that they are likely to make another book purchase. Accordingly, the provider device 104 may determine to preload new book suggestions or advertisements to the user device 102. For example, when the user has viewed at least 90% of a book the provider device 104 may select book content for preloading. In another instance, when the user has viewed a 50% of the pages in a periodical (e.g., news magazine), the provider device 104 may preload content related to other news periodicals and/or another edition of the current periodical. The preloaded content may include advertisements for the periodicals or product information pages related to the periodicals.

In another embodiment, the preloaded content may also be selected based, at least in part, on the type of network elements in the network 106. For example, different types of content may be selected based on whether the user device is using a Wi-Fi network or a wireless phone network to send and receive data to the provider device 104. This embodiment will be discussed in greater detail below in the description of FIG. 2.

At block 112, the provider device 104 may send the preloaded content 116 to the user device 102 before the content is requested by the user. For example, the preloaded content may be sent to the user device 102 before the user device 102 sends a request for the content. The content may be sent over a wired network, a wireless network, and/or a combination thereof. In one embodiment, at least a portion of the network is wireless. For example, the user device 102 may be using a Wi-Fi network to send and receive information. In another instance, the user device 102 may be using a wireless phone network to send and receive information.

Figure 2:
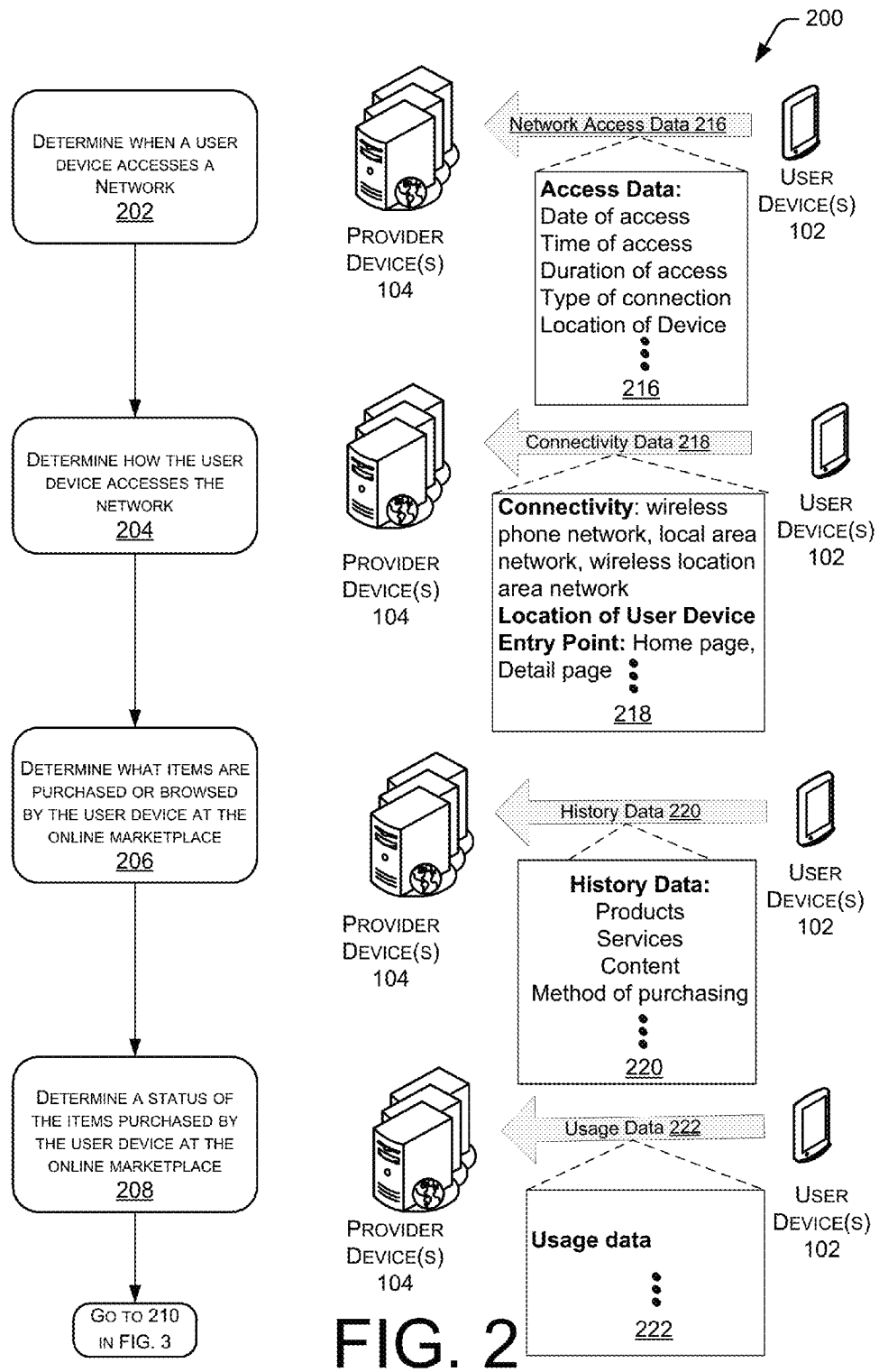
FIGS. 2 and 3 illustrate a flow diagram for a method determining which content will be preloaded onto a user device before the content is requested in accordance with one or more embodiments of the disclosure.
Figure 3:
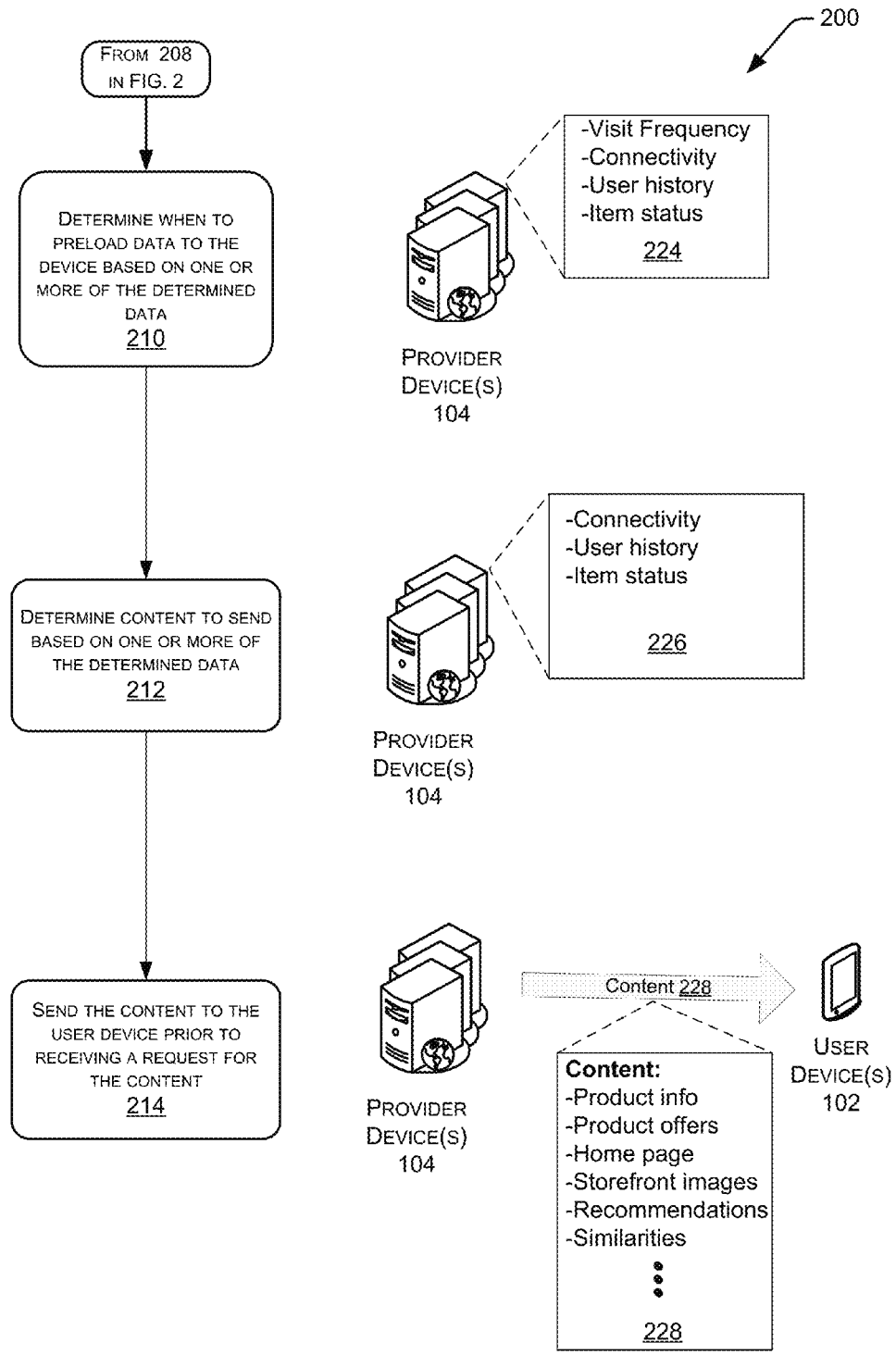

FIGS. 2 and 3 illustrate a flow diagram for a method 200 determining which content will be preloaded onto a user device 102 before the content is requested from the provider device 104. The web service provider may monitor the activities of the user device 102 (and other user devices) that may be operated by the same user. The activity information may be used to determine what content the user is likely to request from the provider device 104. The activity information may be based on historical interactions with the provider device 104 and may include on-going interactions. Accordingly, the provider device 104 may anticipate user content requests based on historical and current actions.

At block 202, the provider device 104 may monitor and collect access data 216 from the user device 102. The access data 216 may include any information indicating that a user device 102 accesses the network 106 and/or interfaces with the provider device 104. For example, the access data may include, but is not limited to, a time of the access event, a date of the access event, location of the user device 102, and/or duration of the access event. The provider device 104 may use the access data to determine a frequency and/or distribution of the access events. The access data 216 may be used to predict when the user is likely to access the network 106 and/or interface with the provider device 104. For example, the user may access the network 106 and browse the web service provider's web site every morning, but rarely makes a purchase in the morning. The user may also tend to access the website that afternoon or the following afternoon to also browse the web site. However, the user tends to purchase a majority of their items during the afternoon session. In one instance, the user tends to makes 80% of their purchases during the afternoon session. Therefore, when the user initiates an afternoon browsing session, the provider device 104 may preload all of the product information that the user viewed from the last few morning browsing sessions. The provider device 104 may also load recommendations based on the browsed items from the morning session.

In another embodiment, the user device 102 may remain connected to the network 106 when the user is not using the device. The provider device 104 may use the access data 216 to determine that the user is likely to browse the web site at least once over the next two hours. The provider device 106 may send preload content 116 to the idle user device 102 that is still connected to the network 106. Therefore, when the user begins browsing the web site, the preload content may be instantly available and the user device 102 may not have to send a content request to the provider device 104. However, when the user selects a web page that may not be included in the preloaded content, the user device 102 may send a content request to the provider device 104.

At block 204, the provider device 104 may determine the type of network elements the user device 102 may be using to interface with the provider device 104. The user device 102 may be using a wired or wireless connection to send and receive data over the network 106. The provider device 104 may query the network 106 or the user device 102 for connectivity data that indicates the type of network connection. The connectivity data 218 may indicate that the user device 102 is using a wireless phone network, a local area network, or a wireless local area network and/or the location of the user device 102. The location may be tracked using the network or by tracking the Internet Protocol (IP) address.

The provider device 104 may select different types of preload content based, at least in part, on the type connection. For example, wireless phone network connections may have smaller bandwidth capability and may have additional costs associated with their use over the other types of network connections. Accordingly, the provider device 104 may select smaller memory preload content items. For instance, instead of selecting a web page with audiovisual content, the provider device 104 may select a similar web page that includes still images instead of the audiovisual content. This may be due to the fact the memory size of the still image may be less than the memory size of the audiovisual content. In another embodiment, the provider device may limit the total amount of preload content based on the memory size of all the preload content items. In this instance, the provider device may not select smaller memory items, but may limit the total amount of preload items. For example, instead of selecting ten web pages (e.g., 10 Megabytes of data) to preload, the provider device 102 may just select five web pages (e.g., 5 Megabytes of data) to preload. This technique may limit the total amount of memory that will be transferred to the user device 102. Hence, the cost of transferring over wireless phone network may be less expensive. Further, the smaller amount of preload content may enable the network 106 to transfer the preload content in a shorter amount of time.

In another embodiment, the provider device 104 may also store the type of network connection that was used to interact with the network 106. This will allow the provider device 104 to predict not only when the user device 102 will interact with the network, but what type of network connection that may be used the wireless phone network or the Wi-Fi network. This may enable the provider device 104 to wait for the user device 102 to use the Wi-Fi connection to transfer memory intensive content. In one specific embodiment, the Wi-Fi connection may be cost free to the web service provider and the wireless phone network connection may be paid for by the web service provider. Accordingly, the web service provider may wait to transfer content until the Wi-Fi connection is available or transfer the content over the wireless phone network during off-peak hours. The off-peak hours may be at a reduced cost and may allow the transfer to be completed faster due to the lower amount of traffic on the wireless phone network.

At block 206, the provider device 104 may review historical data 220 associated with the user and/or the user device 102 to predict which content the user may request. In one embodiment, the historical data 220 may include a purchase history of products, services, and/or content. In some instances, the historical data 220 may also include content stored on the user device 102 that was not purchased from the web service provider. The provider device 104 may select preload content that may be directly or tangentially related to the historical data 220.

The historical data 220 may also include the method of purchasing, which may involve tracking how the user interfaced with the website to purchase an item. For example, the user may have a preference for purchasing items from the recommendations rather than top ten lists. When the user shows a preference for how they browse leading up to a purchase may be used to determine or prioritize which content will be pre-loaded onto the user device 102. The user may show a preference for recommendations, but the user also shows a strong tendency to review the customer reviews for an item prior to making a purchasing. In this embodiment, the recommendations and the associated customer reviews for the items on the recommendation list may be pre-loaded prior to loading the top ten lists.

At block 208, the provider device 104 may query the user device 102 for usage data 222 which may indicate whether the user has used the item and, if so, how much the item has been used. For example, the usage information for an electronic book may indicate whether the user has viewed any portion of the book and/or how much of the book may have been viewed. The usage information may indicate how many pages have been viewed or may indicate a percentage of the pages that have been viewed. In some cases, the provider device 104 may select certain types of preload content based, at least in part, on whether the user has completed or nearly completed reading the book. For example, the provider device 104 may select product pages or advertisements for books written by the same author or in a similar genre to be preloaded onto the user device 102.

At block 210, the provider device 104 may determine when to send the preload content 116 based on a variety of delivery factors 224 that may include, but are not limited to, visit frequency, connectivity type, user history, and item status. The factors may be considered individually or in one or more combination with each other. In general, the preload content may be sent when the user will be available to view the content and/or is more likely to purchase the content. This may be balanced against the cost of sending the preload content 116. The cost considerations may include paying to use a wireless phone network (e.g., 3G/4G/LTE) connection versus a cost free Wi-Fi connection. The cost considerations may also include the cost of network resources to process and send the preload content 116. For example, a user that is likely to make a purchase may have preload content sent to them during peak or off-peak network times. However, a user that has a lower likelihood of making a purchase may be sent preload content 116 during off-peak network times.

The likelihood of making a purchase may be based on, but is not limited to, the user's history and the item status. The provider device 104 may determine that a user purchases items on a consistent or predictable basis. The user may purchase a certain type of item as soon as the item becomes available. For example, the user may purchase new music from a particular band or artist as soon as it becomes available. Additional purchasing patterns may be based on the time of day (e.g., morning versus evening), seasons (e.g., birthday, Christmas, start/end of school, or any holiday), sale offerings (e.g., daily deal, rebates), brand names, or repeat orders (e.g., monthly purchases for home supplies).

Item status information for items purchased by the user may also indicate a higher likelihood that a purchase may be made at a certain time. The item status may indicate if the purchased item has been used and, if so, how much and/or how frequently has the item been used. A high usage rate may indicate that a user may be interested in purchasing other items that are similar to the item, or purchasing items that may work peripherally with that item or that enhance the capability of the that item. The items status may also indicate a higher user purchasing likelihood based on how much of the item has been consumed or used. For example, when a user has viewed 90% of the pages in a book or 50% of the pages in periodical, the user may be more likely to make another purchase of another book or periodical. The provider device 104 may determine that a user is more likely to purchase a newer item (e.g., a new book) when they are finished with the older item (e.g., an older book). The provider device 104 may determine how long a user takes to finish an item and may set a trigger for preload content that includes another item the user is likely to purchase. For example, the provider device 104 may determine that a user will finish reading a book within the next 48 hours. This determination may be based on previous item status information from previous books. Therefore, the provider device 104 may preload web pages, advertisements, or recommendations for other books that the user might purchase within that 48 hour period. Ideally, when the user finishes the book and connects to the network 106, the preload content may be viewed without the user having to request the content from the provider device 104.

At block 212, the provider device 104 may determine which content to send based on which content the user is likely to request and/or which content is more likely to lead to a purchase. The content factors 226 may include, but are not limited to, network connectivity type, user history, and/or item status. As noted above, the user history may provide a strong indication of what types of content the user is likely to request. For example, the user may always start at the home page of the web service provider. Therefore, the preload content 116 may include the home page and all of the pages that are linked within the home page. However, when the user device 102 is using a wireless phone network connection, the preload content may be limited to the home page and the pages linked to the home page that are related to books. The user history may indicate that the user browses the book section of the web site 80% of the time. Therefore, the web pages related to topics other than books may be omitted from the preload content 116. Hence, reducing the amount of preload content may reduce the cost of using the wireless phone network.

At block 214, the provider device 104 may send the preload content 228 to the user device when delivery timing and the type of preload content has been determined as described above. The content 228 may be sent over the network 106 which may use a wireless local area network or a wireless phone network to deliver the preload content to the user device 102. The content 228 may include any information related to the web site (or any other online marketplace) in which goods or services are exchanged for money. The preload content 228 may include, but is not limited to product information, product offers, a home page, storefront images or video, purchasing recommendations based on user history, and/or recommendations on similar items that other users have purchased.

Figure 4:
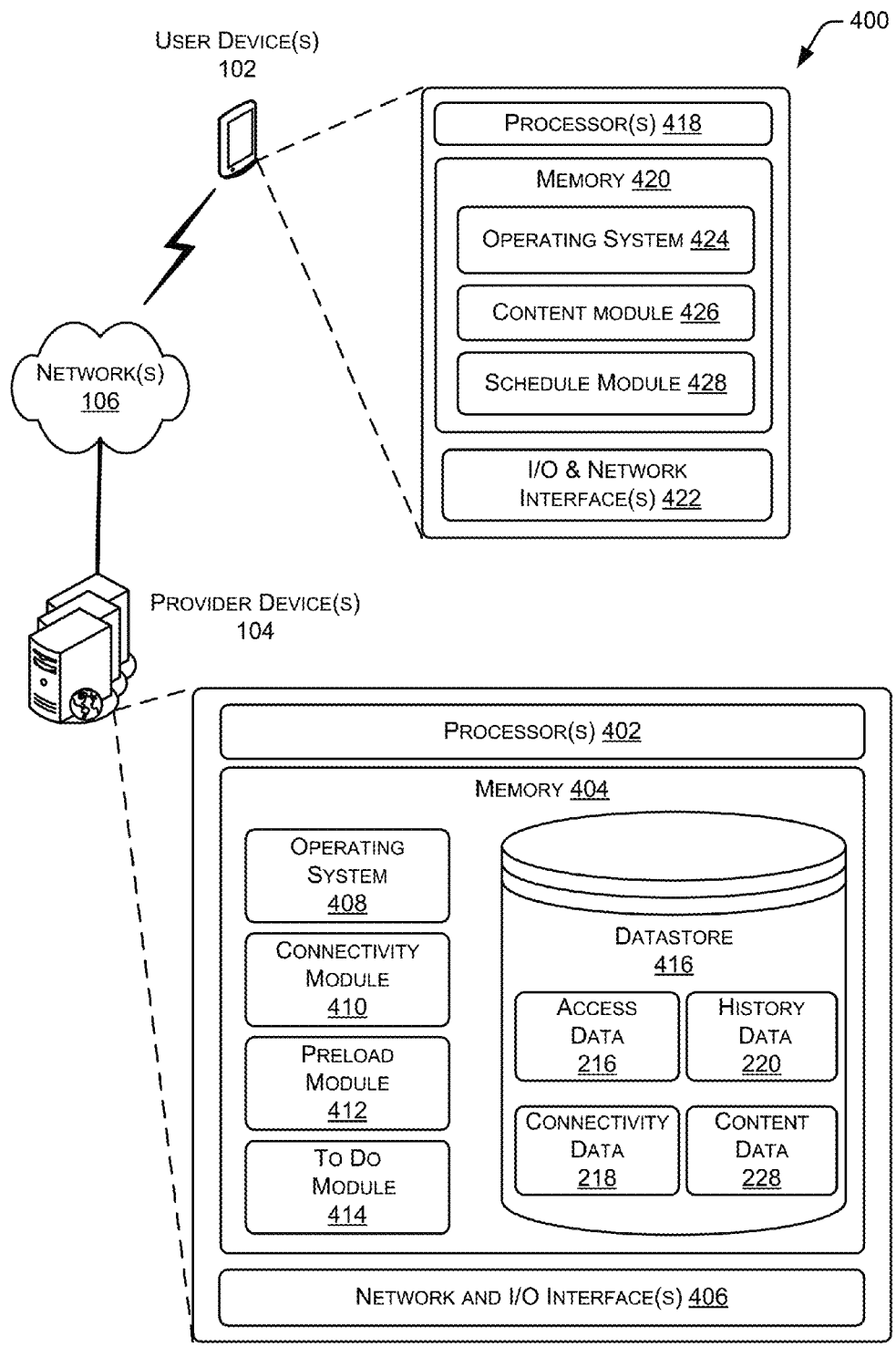
FIG. 4 illustrates a system for preloading content on a user device before the content is requested in accordance with one or more embodiments of the disclosure.

FIG. 4 illustrates a system 400 for preloading content on a user device 102 before the content is requested from the provider device 104. As noted above, the provider device 104 may be operated, administered, or used by a web service provider to distribute content to customers (e.g., user device 102) over a network 106. The provider device 104 may improve the store experience for customers by preloading content onto their user device(s) 102. The preloaded content improves the store experience by making content nearly instantaneously available by eliminating the wait time to send a content request and receive a response from the provider device 104. As noted above, the provider device 104 may determine the type of preload content to send and when to send the preload content to meet the "just in time" needs of the users. The improved store experience may lead to improved sales performance for the web service provider. While a single user device 102 and a provider device 104 are shown, it is understood that any number of these devices may be present in the system 400.

The provider device 104 may include one or more processors 402, a memory 404, and one or more network and input/output interfaces 406 to communicate with the user device 102, the network 106, or a device administrator.

The computer processors 402 may comprise one or more cores and are configured to access and execute (at least in part) computer-readable instructions stored in the one or more memories 404. The one or more computer processors 402 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The provider device 104 may also include a chipset (not shown) for controlling communications between the one or more processors 402 and one or more of the other components of the provider device 104. In certain embodiments, the provider device 104 may be based on an Intel® architecture or an ARM® architecture and the processor(s) 402 and chipset may be from a family of Intel® processors and chipsets. The one or more processors 402 may also include one or more application-specific integrated circuits (ASICs) or application-specific standard products (ASSPs) for handling specific data processing functions or tasks.

The interfaces 406 may also comprise one or more communication interfaces or network interface devices to provide for the transfer of data between the provider device 104 and another device (e.g., user device 102) via a network 106. The communication interfaces may include, but are not limited to: personal area networks ("PANs"), wired local area networks ("LANs"), wireless local area networks ("WLANs"), wireless wide area networks ("WWANs"), and so forth. In FIG. 4, the provider device is coupled to the network 106 via a wired connection. However, the wireless system interfaces may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical or other signals to exchange data between the provider device 104 and another device such as an access point, a host computer, a server, a router, a reader device, and the like. The network 106 may include, but is not limited to: the Internet, a private network, a virtual private network, a wireless wide area network, a local area network, a metropolitan area network, a telephone network, and so forth.

The one or more memories 404 comprise one or more computer-readable storage media ("CRSM"). In some embodiments, the one or more memories 404 may include non-transitory media such as random access memory ("RAM"), flash RAM, magnetic media, optical media, solid state media, and so forth. The one or more memories 404 may be volatile (in that information is retained while providing power) or non-volatile (in that information is retained without providing power.) Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 404 may store an operating system 408 that includes a plurality of computer-executable instructions that may be implemented by the processor 402 to perform a variety of tasks to operate the interface(s) 406 and any other hardware installed on the provider device 104. The memory 404 may also include a connectivity module 410, a preload module 412, a to-do module 414, and a data store 416.

The connectivity module 410 may determine the type of network connection the user device 102 may be using to connect to the network 106. As noted above in the description of FIG. 1, the user device 102 may use a wired or wireless connection to interface with or exchange data with network 106. The wireless connection may include, but is not limited to, a wireless phone network or a wireless local area network. The wireless phone network may comply with International Mobile Telecommunications-2000 standard (e.g., 3G telecommunications technology) (See; ITU-R M.687 published in February 1997) or International Mobile Telecommunications-Advanced (e.g., Long Term Evolution standard (LTE) or 4G telecommunications technology) (See; ITU-R IMT-ADV published in March 2008). In contrast, the wireless local area network may comply with the IEEE 802.11 wireless standard (See; IEEE 802.11-2007, published Mar. 8, 2007; IEEE 802.11n-2009, published October 2009).

In one embodiment, the user device 102 may provide the wireless network connection type to the connectivity module 410. For example, after connecting to the network 106, the user device 102 may send a message to the provider device 104 with the network connection information. Alternatively, the provider device 104 may query the network 106 or the user device 102 to determine the network connection type. In one specific embodiment, when the user device 102 connects to the wireless phone network, the provider device 104 may receive the connection type information from the wireless phone network provider (not shown). In this instance, the provider device 104 may not query the user device for the network connection type information and the user device 102 may not provide the network connection type information to the provider device 104.

The connectivity module 410 may collect the access data 216 and determine when the user device 102 is likely to connect to the network 106. The access data 216 may be used to determine the frequency and time distribution of when the user device connects to the networks 106 and when the user device 102 interacts with the provider device 104. Accordingly, the web service provider may know when the user device 102 is likely to be available to receive preload 116 data. The availability information enables the connectivity module 410 to optimize when the preload data may be sent to the user device 102. For example, during peak network traffic times, the connectivity module 410 may determine that the user device is likely to be available during off-peak times based, at least in part, on the availability data. Therefore, network congestion may be reduced or network cost may be reduced by using the network 106 during lower cost off-peak times.

The preload module 412 may aggregate the preload content 116 based, at least in part, on: network type connection, entry point of the user device to a web site, user browsing history, user purchasing history, usage information related to the purchased items, the frequency and distribution (e.g., timing and duration) of how much the user visits or accesses the network 106 or the web service provider web site, and/or the frequency and distribution of when the user makes purchases from the web service provider. The preload module 412 determines which content the user will most likely want to see based on the user preferences and user history. As noted above in the discussion of FIGS. 2 and 3, the user may demonstrate a consistent preference to certain types of content and certain preferences on how to access the content (e.g., home page vs. product specific web page). For example, the user may prefer to start browsing with a topic, product type, or genre page instead of the web service provider's home page. The user may start at the top level music web page instead of the home page that includes links to books, movies, or other consumer products. Accordingly, the preload module 412 may select the music page and the content linked within the music page as preload content 116, instead of the home page and the content linked to the home page.

In another instance, the preload module 412 may determine that the user browses the music content in the morning, but the user browses consumer electronics in the afternoon. The preload module 412 may aggregate music content in the early morning or the previous evening and send it to the user device 102. However, the consumer electronics content may be aggregated in the late morning and sent to the user device by the afternoon.

In another instance, the preload module 412 may determine that the user is more likely to purchase items in the afternoon. Therefore, the morning browsing content (e.g., music content) may also be preloaded to a device before the afternoon browsing session. In this case, the music content and the consumer electronics content may be preloaded in the same download session.

Based on the frequency and distribution of user browsing, the preload module 412 may aggregate preload content 116 based on how long the user is likely to browse the web site. For example, the user may browse the web site for two to three hours, on average, in the evening and thirty to sixty minutes in the morning. Accordingly, the preload module 412 may aggregate a smaller amount of content for the morning session to reduce networking cost (e.g., wireless phone network connection paid by the web service provider), unless the user device 102 is using a cost free network connection (e.g., Wi-Fi connection). In contrast, the likelihood of the longer afternoon session may result in a larger aggregation of content that may include several topic areas of interest to the user. In comparison, the shorter morning session may include fewer topics to correlate with the smaller amount of aggregated content.

As noted above in the discussion of FIGS. 2 and 3, the preload module 412 may determine which content the user is likely to request based on the user's purchasing history. The aggregated content may include items that support or augment the purchased items. For example, a printer or consumer electronic item may need peripheral items, such as ink cartridges, paper, software applications, or carrying cases. The preload module 412 may aggregate content (e.g., ads and/or product descriptions) related to those peripheral items and send them to the user device 102.

The to-do module 414 may determine when the provider device 104 may send preload content 116 to the user device 102. In one embodiment, the user device 102 may send a connection schedule to the to-do module 414. The schedule may include a periodic check-in time initiated by the user device 102. The check-in may be used to request content that may be waiting to be downloaded to the user device 102. The content may include previously purchased content that has not been downloaded and/or any preload content 116 that may be waiting to download. The schedule may be intermittent or periodic based on the status of the items stored on the user device 102. For example, the user device 102 may store a subscription based periodical that is updated once a week with new content. The user device 102 may schedule a download at least once a week to capture the new periodical content when it becomes available. In another instance, other content providers (e.g., music, movies, or books) may release new content for sale on a weekly basis. The to-do module 414 may schedule a weekly connection with the provider device 104 to download advertisements or product information content related to the newly released content. The to-do module 414 may receive these schedule requests and manage them accordingly by directing the preload module 412 to include the new content into preload content 116. The new content may be in addition to other content that was likely to be requested by the user device 102. Naturally, the new content may be sent to the user device by itself, without the other aggregated preload content 116.

The datastore 416 may store the data used by the provider device 104 to implement the preload concepts discussed above and store the content that the user device 102 may purchase from the web services provider. The datastore 416 may store the access data 216 that documents when the user device accesses the network 106 or the interfaces with the provider device 104. The connectivity data 218 may also be stored within the datastore 416. This may include documentation of which network connections the user device uses and the entry points into the web service provider's web site. The datastore may also include the history data 220 for each user that interfaces with the web service provider (e.g., provider device 104). The history data 220 may include, but is not limited to, the user's browsing history and purchasing history. Additionally, the datastore 416 may also store the electronic content data 228 that may be used to support the web service provider's web site and/or any electronic content that may be purchased by the user.

The system 400 may also include one or more user devices 102. The user device 102 may be one of a variety of communication devices that may include, but is not limited to: smartphones, mobile phones, laptop computer, desktop computer, tablet computers, televisions, set-top boxes, game consoles, in-vehicle computer systems, and so forth.

The user device 102 may also include one or more computer processors 418, a memory 420, and one or more I/O and network interfaces 422.

The computer processors 418 may comprise one or more cores and are configured to access and execute (at least in part) computer-readable instructions stored in the one or more memories 420. The one or more computer processors 418 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more computer processors 418 and one or more of the other components of the user device 102. In certain embodiments, the user device 102 may be based on an Intel® architecture or an ARM® architecture and the computer processor(s) 418 and chipset may be from a family of Intel® processors and chipsets. The one or more computer processors 418 may also include one or more application-specific integrated circuits (ASICs) or application-specific standard products (ASSPs) for handling specific data processing functions or tasks.

The I/O interfaces 422 may include coupling devices such as keyboards, joysticks, touch sensors, cameras, microphones, speakers, haptic output devices, memories, and so forth to the user device 102. The network interfaces 422 may also comprise one or more communication interfaces or network interface devices to provide for the transfer of data between the user device 102 and another contact user device 102 directly such as in a peer-to-peer fashion, via a network 106, or both. The communication interfaces may include, but are not limited to: personal area networks ("PANs"), wired local area networks ("LANs"), wireless local area networks ("WLANs"), wireless phone networks, wireless wide area networks ("WWANs"), and so forth. In FIG. 4, the user device 102 is coupled to the network 106 via a wireless connection. The wireless system interfaces (not shown) may include the hardware and software to send and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system may include one or more transmitters and receivers or a transceiver (not shown) capable of operating in a broad range of operating frequencies governed by the IEEE 802.11 wireless standards or one or more of the following cellular standards: Global System for Mobile Communications (GSM™), Code Division Multiple Access (CDMA™), Universal Mobile Telecommunications System (UTMS™), Long Term Evolution (LTE™), General Packet Radio Service (GPRS™), High Speed Downlink Packet Access (HSDPA™), Evolution Data Optimized (EV-DO™). The communication interfaces may utilize acoustic, radio frequency, optical or other signals to exchange data between the user device 102 and the network 106.

The one or more memories 420 may comprise one or more computer-readable storage media ("CRSM"). In some embodiments, the one or more memories 420 may include: non-transitory media such as random access memory ("RAM"), flash RAM, magnetic media, optical media, solid state media, and so forth. The one or more memories 420 may be volatile (in that information is retained while providing power) or non-volatile (in that information is retained without providing power.) Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 420 may store an operating system 424 that includes a plurality of computer-executable instructions that may be implemented by the computer processor 418 to perform a variety of tasks to operate the interface(s) 422 and any other hardware installed on the user device 102. The memory 420 may also include a content module 426 and a schedule module 428.

The content module 426 may store the electronic content received from the provider device 104. The content may include the preload content 116 or any other content that may have been purchased from the web service provider. The purchased content may include books, movies, music, games, software applications, or any other form of electronic content that may be stored on the user device 102.

The schedule module 428 stores instructions to generate predetermined connection times between the user device and the network 106 and/or the provider device 104. The predetermined connection times may be chosen at random or on a periodic basis. The predetermined connection times insure that the user device 102 may receive system updates or application updates from the provider device 104. In another embodiment, the predetermined connection times may be based on the updates to the content stored on the user device 102. For example, a subscription periodical may be stored on the user device 102. The subscription content provider may generate new content on a periodic basis. A predetermined time connection may be scheduled to receive the new content as soon as it becomes available. For example, if the new content is published every Wednesday at 10 am, the user device 102 may establish a predetermined connection time for every Wednesday at 10:15 am.

Figure 5:
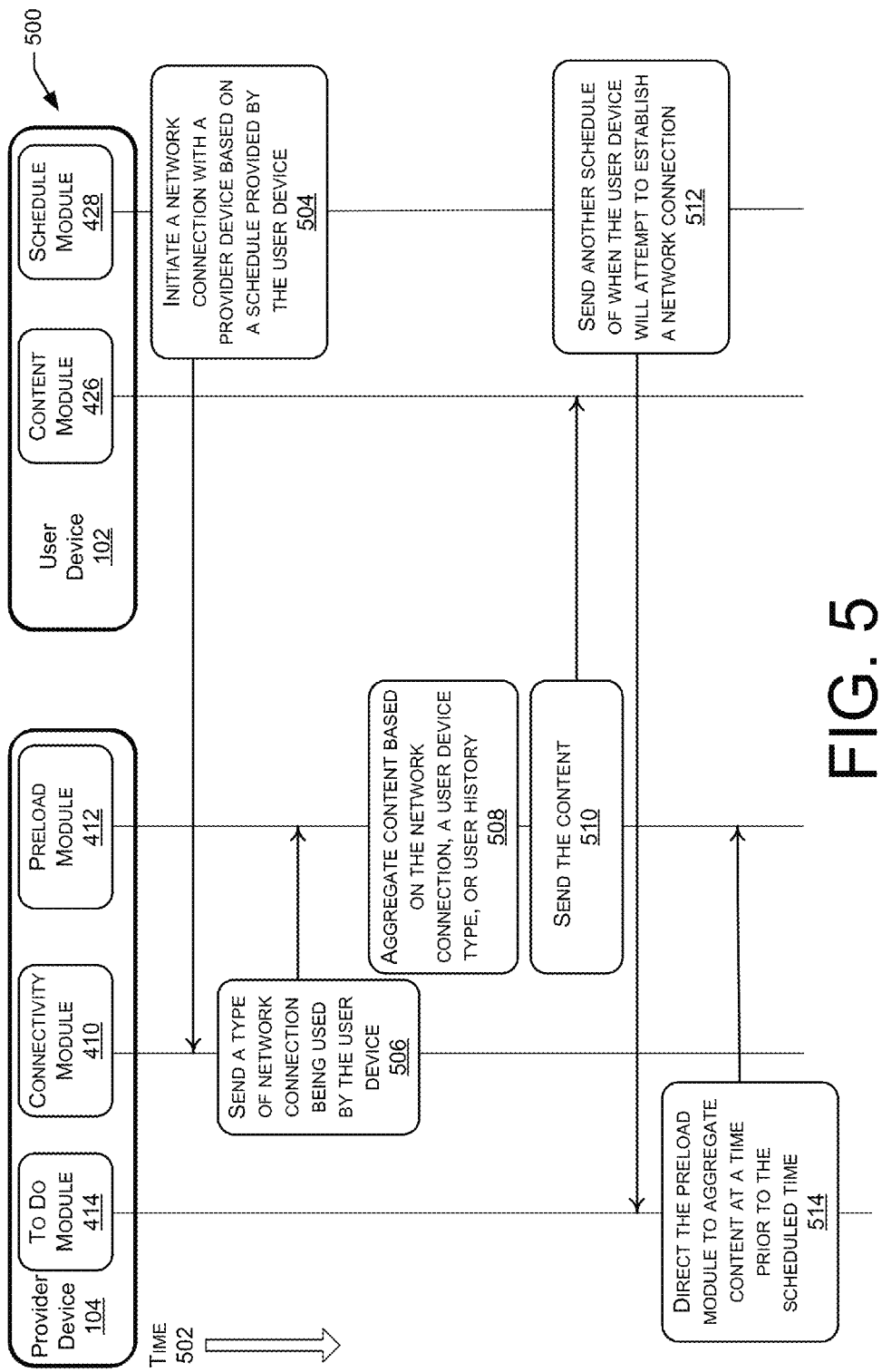
FIG. 5 illustrates a flow diagram for a method for transferring content between a web service provider and a user device in accordance with one or more embodiments of the disclosure.

FIG. 5 illustrates a flow diagram for a method 500 for transferring content between the provider device 104 and the user device 102 in compliance with a schedule provided by the user device 102. The method 500 includes a time axis 502 which indicates that the operations at the top of the method diagram may be performed before the operations below them. The method 500 illustrates one embodiment of the transfer of information that may occur between the user device 102 and the provider device 104. It should be noted that in other embodiments the sequencing of the method 500 may be altered and some steps may be omitted.

At block 504, the schedule module user device 102 may initiate a network connection with the provider device 104 at a predetermined time set by the user device 102. The predetermined time may be a randomly periodic time selected to obtain content that may be waiting to be downloaded from the provider device 104 to the user device 102. In another embodiment, the predetermined time may be a consistent periodic time to request updates from the provider device 104. For example, the periodic time may be based on the availability of new subscription content that is available on a periodic basis. Therefore, there may be more than one scheduled connection. There may be a different scheduled connection times to collect subscription data, update user device applications, and/or receive preloaded content 116 from the provider device 104.

At block 506, the connectivity module 410 may receive an indication that the user device 102 has connected to the network 106 and may be available to receive content from the provider device 104. As a result, the connectivity device 410 may direct the preload module 412 to aggregate preload content (or any other content) that is waiting to be downloaded to the user device 102.

At block 508, the preload module 412 may aggregate content that the user is likely to request based, at least in part, on the user's browsing history, purchasing history, and/or user preferences. The selection of the content is described above in the discussion of FIGS. 1-4 in greater detail. The content may also include software updates to the user device 102 operating system or applications stored on the user device 102.

At block 510, the provider device 104 may send the content to the user device 102. The provider device 104 may determine to send the content over certain elements of the network 106. For example, the content may be delivered to the user device 102 using the wireless phone network or a wireless local area network. In one embodiment, the wireless phone network may incur additional costs to the web service provider, while the wireless local area network does not incur additional costs. Generally, the provider device 104 will elect the lower cost option when the lower cost option is available.

In another embodiment, the provider device 104 may elect to send the content at off-peak hours to mitigate network congestion. The provider device 104 may prioritize content to differentiate between active content requests that a user is waiting to receive versus preload content requests that are for future use by the user. The responses to active content requests may be sent before the preload content responses. In some instances, the preload content responses may be held and sent during off-peak hours for the network 106 or the provider device 104. For example, peak hours may include business hours and early evening hours and off-peak hours may include overnight hours or any other time that network traffic or provider device 104 utilization is below average. The content may be received and stored in the content module 426 of the user device 102.

At block 512, the schedule module 428 may send another connection time schedule to the to-do module 414. As noted above in the discussion of block 504, the connection time indicates that the provider device 104 should be ready to download content to the user device based on the schedule.

At block 514, the to-do module 414 may notify the preload module 412 to aggregate content for the user device 102 prior to the scheduled connection time. The notification may be done within a predetermined time limit before the scheduled connection. The predetermined time limit may vary based on the amount of time available before the scheduled connection and the utilization of the provider device 104. For example, the predetermined time limit may be thirty minutes prior to the scheduled connection. However, if the scheduled connection is within thirty minutes, the content aggregation request may be sent as soon as possible. In another embodiment, if the utilization of the provider device 102 is likely to be high when the content aggregation request is scheduled to be sent, the aggregation request may be sent before the predetermined time. For example, the content aggregation request may be sent when the provider device 104 has a lower utilization rate.

Figure 6:
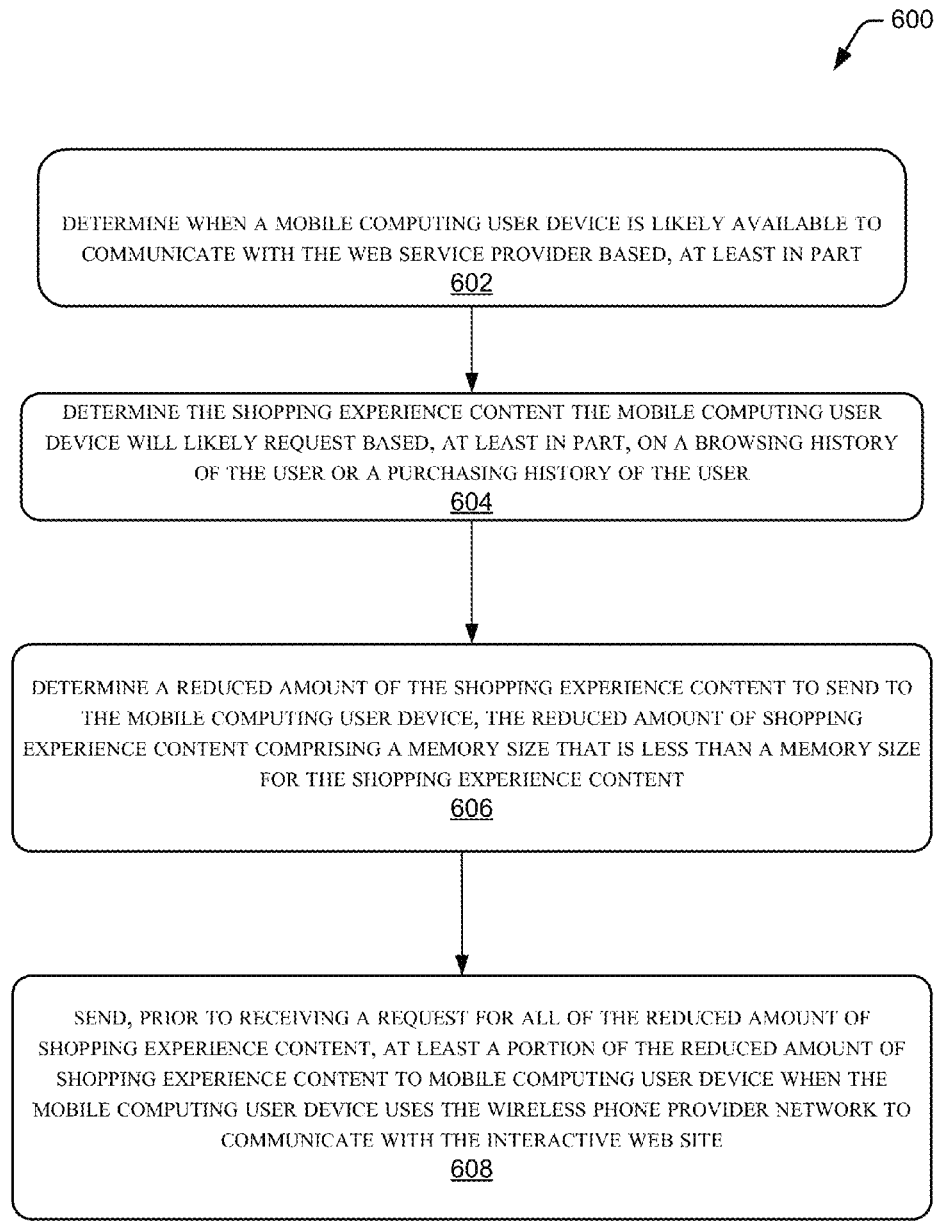
FIG. 6 illustrates a flow diagram for a method for determining which content to preload onto a user device to improve a user's store experience on a web site in accordance with one or more embodiments of the disclosure.

FIG. 6 illustrates a flow diagram for a method 600 for preloading content onto a user device 102 before a user requests the content. The provider device 104 may determine which content the user is most likely to request based, at least in part, on the user's history or preferences. The content may be preloaded when the user device connects to the network 106 or the provider device 104. The method 600 illustrates one embodiment on the transfer of information that may occur between the user device 102 and the provider device 104. It should be noted that in other embodiments the sequencing of the method 600 may be altered and some steps may be omitted.

At block 602, the provider device 104 may determine when a mobile computing user device 102 is most likely available to communicate or interface with the network 106 or the interactive web site of a web service provider. The availability determination may be based, at least in part, on: a schedule provided by the mobile computing user device 102, a visit frequency of a user to the web site, a purchased item status indicating the user has viewed or used a threshold amount of a purchased item and/or a content subscription that enables access to subscription content on a periodic basis. Various embodiments discussed in the description of FIGS. 2-4 above show how the above factors may be used to determine when the user device is likely to connect to the network 106 or the provider device 104.

In another embodiment, the visit frequency may also include an amount of user web site visits using another device besides the user device 102 mentioned above. For example, the user may access the web site using their smartphone, laptop, tablet, and/or a desktop computer. The provider device 104 may be able associate the visits from multiple devices to a single user. The association may be accomplished using a user login for each user, monitoring the metadata of each user, and/or the IP addresses for each visitor to the web site.

At block 604, the provider device 104 may also determine the shopping experience content the user of the mobile computing user device 102 will likely request based, at least in part, on a user's browsing history and/or purchasing history. The shopping experience content may include, but is not limited to: home page content, interactive web site images, interactive advertisements, or product recommendations based, at least in part, on the user's browsing and purchasing history. The product recommendations may also include the purchases by other users that have purchased at least one item that the user has purchased. For example, if users A and B have purchased the same book, then other books purchased by user B may be recommended to user A.

In another embodiment, the provider device 104 may predict or determine the user's entry point to the web site. In this case, the content of that entry point may be selected to be preloaded on to the user device 102. The entry point may also include links to additional content. In certain instances, the linked content may also be selected for preloading.

In another embodiment, the provider device 104 may also select common or most used content features of the web site to be preloaded on to the user device 102. This may include, but is not limited to: popular search results, special offers (e.g., daily deals), frequently asked questions, and contact information. The additional content may also include product information for top selling items on the web site.

At block 606, the provider device 104 may determine that a reduced amount of the shopping experience content should be sent to the user device 102. The reduction may be based, at least in part, on network 106 utilization, provider device 104 utilization, and/or network connection type.

In one embodiment, when the network 106 utilization is above a certain threshold, the amount of information being pushed to the network 106 may be reduced by limiting the memory size of the shopping experience content that is being preloaded onto user devices 102. The memory size reduction may be accomplished by setting a memory limit for each user device 102 or using smaller memory content. The smaller memory content may include still images that are used instead of video images, low resolution images instead of high resolution images, and/or simple font type text instead of intricate font type text.

In another embodiment, the provider device 104 may send a reduced amount of content due to the network connection type. In this embodiment, the web service provider may bear the cost of using the wireless phone network to send content to the user device 102. Therefore, the provider device 104 may limit the memory size of the content to cost of using the wireless phone network. However, when the user device 102 is using a wireless connection that does not increase the cost for the web service provider, the provider device 102 may send all the content. The content elements may also be sent without restriction on memory size.

At block 608, prior to receiving a request for the reduced amount of shopping experience content, the provider device 104 may send at least a portion of the reduced amount of shopping experience content to mobile computing user device 102 when the mobile computing user device 102 uses the wireless phone provider network to communicate with the interactive web site.

Figure 7:
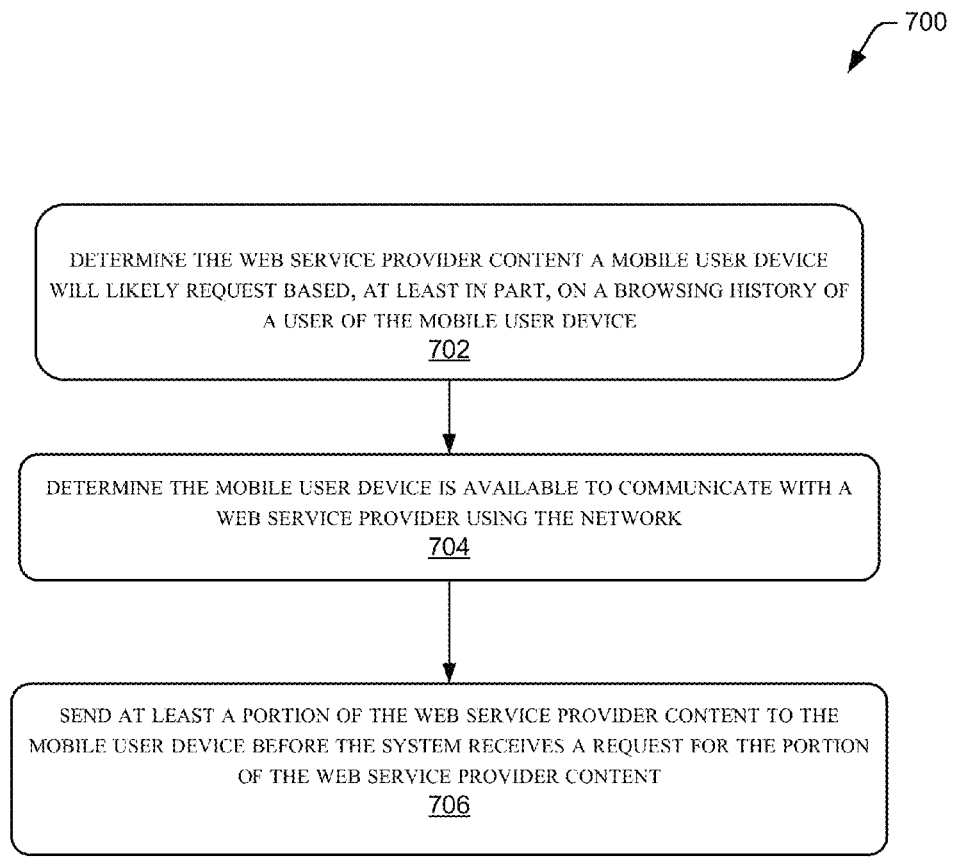
FIG. 7 illustrates a flow diagram for another method for determining which content to preload onto a user device to improve a user's store experience on a web site in accordance with one or more embodiments of the disclosure.

FIG. 7 illustrates a flow diagram for a method 700 for preloading content onto a user device 102 before a user requests the content. The method 700 illustrates another embodiment on the transfer of information may occur between the user device 102 and the provider device 104. It should be noted that in other embodiments the sequencing of the method 700 may be altered and some steps may be omitted.

At block 702, the provider device 104 may predict when a user device is likely available to communicate with the web service provider based, at least in part, on a user's browsing history. The browsing history may indicate the frequency and timing of when the user device 102 interacts with the network 106 and/or when the user interfaces with the web site.

At block 704, the provider device 104 may determine the mobile user device is available to interact with a web service provider web site. The determination may be based on a message received from the user device 102 or from the network service provider.

At block 706, the provider device 104 may send at least a portion of the web service provider content to the mobile user device before the web service provider receives a request for the portion of content.

In one embodiment, the provider device 104 may determine the mobile user device is using the wireless local area network to communicate with the web site. In this case, the web service provider content may send all of the preload content to user device 102.

In another embodiment, the provider device 104 may determine the mobile user device is using the wireless phone network to communicate with the system. In this case, the web service provider content may send a smaller amount of the preload content.

Figure 8:
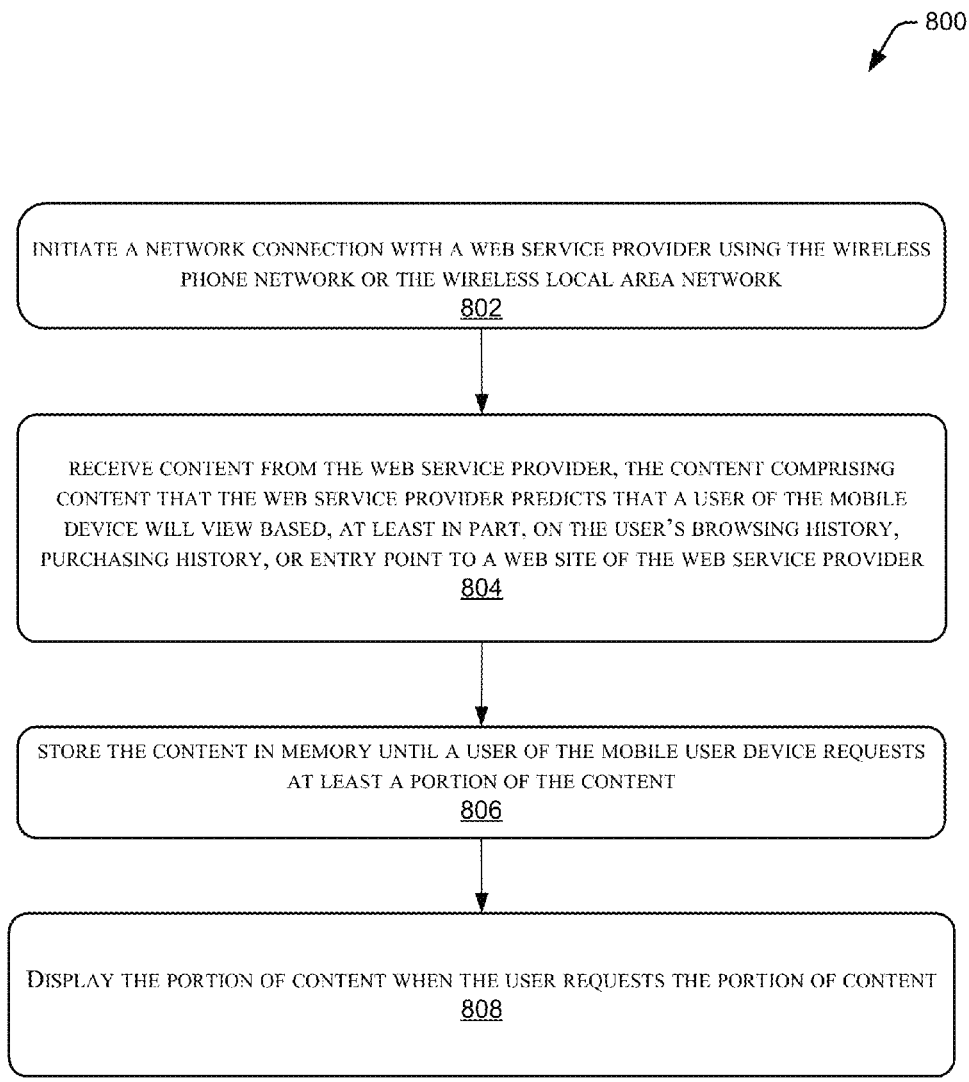
FIG. 8 illustrates a flow diagram for a method for receiving the preloaded content on a user device in accordance with one or more embodiments of the disclosure.

FIG. 8 illustrates a flow diagram for a method 800 for user device 102 that receives content from a provider device 104 prior to the user device 102 sending a request for the content. The method 800 illustrates another embodiment on the transfer of information may occur between the user device 102 and the provider device 104. It should be noted that in other embodiments the sequencing of the method 800 may be altered and some steps may be omitted.

At block 802, the user device 102 may initiate a network connection with a web service provider using a wireless phone network or a wireless local area network.

At block 804, the user device 102 may receive content from the web service provider before sending a request for the content. The content may include web site content that the web service provider predicts that a user of the user device 102 will view based, at least in part, on the user's browsing history, purchasing history, entry point to a web site of the web service provider, time of day, and/or the location of the user device 102.

At block 806, the user device 102 may store the content in memory until a user of the mobile user device requests the content.

At block 808, the user device 102 may display, on a display screen, the content when the user makes a request to view the content.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions for an online marketplace;
   at least one network communication device to communicate over at least one network, the at least one network comprising at least one of: a wireless phone provider network or a wireless local area network;
   at least one processor configured to access the at least one network communication device and the at least one memory and execute the computer-executable instructions to:
   receive a communications signal from a mobile device;
   determine to send second shopping experience pre-interaction content to the mobile device based at least in part on the communications signal and at least one of:
      a schedule provided by the mobile device, or
      a visit frequency to the online marketplace;
   determine the second shopping experience pre-interaction content for the mobile-device based, at least in part, on first shopping experience content and at least one of a browsing history or a purchasing history;
   determine first data representing a reduced amount of the second shopping experience pre-interaction content to send to the mobile device, based, at least in part, on the communications signal, wherein the first data represents less than second data representing all of the second shopping experience pre-interaction content;
   send, prior to receiving a request for all of the first data, at least a portion of the first data to the mobile device when the mobile device uses the at least one network to communicate with the online marketplace;
   receive, after the first data is sent to the mobile device, interaction data from the mobile device associated with a second shopping experience;
   determine second shopping experience post-interaction content for the mobile device based, at least in part, on the first shopping experience content and at least one of the browsing history or the purchasing history;
   determine third data representing a reduced amount of the second shopping experience post-interaction content to send to the mobile device; and
   send at least the third data to the mobile device before receiving a request for the third data.

2. The device of claim 1, wherein the second shopping experience pre-interaction content comprises at least one of home page content, interactive web site images, detailed product descriptions, top product lists, regional products lists, interactive advertisements, or product recommendations based, at least in part, on one of the purchasing history, the browsing history, or other purchases of at least one previously purchased item.

3. The device of claim 1, wherein the visit frequency further comprises an amount of visits to the online marketplace using another computing device.

4. The device of claim 1, wherein determining to send the second shopping experience pre-interaction content to the mobile device is further based, at least in part, on one of a purchased item status indicating a threshold amount of a purchased item or a used threshold amount of the purchased item, the threshold amount being based, at least in part, on the purchasing history.

5. A system, comprising:
   at least one memory that stores computer-executable instructions;
   at least one network communication device to communicate over at least one network;
   at least one processor configured to access the at least one network communication device and the at least one memory and execute the computer-executable instructions to:
   determine service provider pre-interaction content for a mobile device based, at least in part, on first service provider content and at least one of a browsing history or a purchasing history;
   receive a communications signal from the mobile device;
   determine first data representing a reduced amount of the service provider pre-interaction content to send, based at least in part on the communications signal, to the mobile device, wherein the first data is less than second data representing all of the service provider pre-interaction content;
   send, by the system, at least the first data to the mobile device before the system receives a request for the first data;
   receive, after the first data is sent to the mobile device, interaction data from the mobile device associated with a second service provider;
   determine second service provider post-interaction content for the mobile device based, at least in part, on the first service provider content and at least one of the browsing history or the purchasing history;

determine third data representing a reduced amount of the second service provider post-interaction content to send to the mobile device; and send, by the system, at least the third data to the mobile device before the system receives a request for the third data.

6. The system of claim 5, wherein the at least one network comprises at least one of a wireless phone network or a wireless local area network, further comprising computer-executable instructions to:

receive a connection schedule from the mobile device; and aggregate the second service provider pre-interaction content that is compatible with the mobile device.

7. The system of claim 5, wherein the second service provider pre-interaction content comprises at least one of home page content, interactive web site images, detailed product descriptions, top product lists, regional products lists, interactive advertisements, or product recommendations.

8. The system of claim 7 wherein the second service provider pre-interaction content is determined based, at least in part, on one or more purchases of at least one previously purchased item.

9. The system of claim 5, further comprising computer-executable instructions to determine to send the second service provider post-interaction content to the mobile device based at least in part on the communications signal and at least a visit frequency to an online marketplace.

10. The system of claim 9, wherein the visit frequency further comprises an amount of visits to the online marketplace using another computing device.

11. The system of claim 5, wherein determining to send the second service provider post-interaction content to the mobile device is further based, at least in part, on one of a purchased item status indicating a threshold amount of a purchased item or a used threshold amount of the purchased item, the threshold amount being based, at least in part, on the purchasing history.

12. A method comprising:

determining second service provider pre-interaction content for a mobile device based, at least in part, on first service provider content and at least one of a browsing history or a purchasing history;

receiving a communications signal from the mobile device;

determining first data representing a reduced amount of the second service provider pre-interaction content to send, based at least in part on the communications signal, to the mobile device, wherein the first data represents less than second data representing all of the second service provider pre-interaction content;

sending at least the first data to the mobile device before receiving a request for at least a portion of the first data;

receiving, after the first data was sent to the mobile device, interaction data from the mobile device associated with a second service provider;

determining second service provider post-interaction content for the mobile device based, at least in part, on the first service provider content and at least one of the browsing history or the purchasing history;

determining third data representing a reduced amount of the second service provider post-interaction content to send to the mobile device; and sending at least the third data to the mobile device before receiving a request for the second data.

13. The method of claim 12, further comprising:

receiving a connection schedule from the mobile device; and aggregating the second service provider pre-interaction content that is compatible with the mobile device.

14. The method of claim 12, wherein the second service provider pre-interaction content comprises at least one of home page content, interactive web site images, detailed product descriptions, top product lists, regional products lists, interactive advertisements, or product recommendations.

15. The method of claim 14, wherein the second service provider pre-interaction content is determined based, at least in part, on one or more purchases of at least one previously purchased item.

16. The method of claim 12, further comprising:

determining to send the second service provider pre-interaction content to the mobile device based at least in part on the communications signal and at least a visit frequency to an online marketplace.

17. The method of claim 16, wherein the visit frequency further comprises an amount of visits to the online marketplace using another computing device.

18. The method of claim 12, wherein determining to send the third data to the mobile device is further based, at least in part, on one of a purchased item status indicating a threshold amount of a purchased item or a used threshold amount of the purchased item, the threshold amount being based, at least in part, on the purchasing history.

* * * * *